United States Patent
Karia et al.

(10) Patent No.: US 11,647,377 B2
(45) Date of Patent: May 9, 2023

(54) MOBILE DEVICE ROAMING OPTIMIZATION AND OPERATION

(71) Applicant: INTERNATIONAL BUSINESS MACHINES CORPORATION, Armonk, NY (US)

(72) Inventors: Jignesh K. Karia, Thane (IN); Pankaj Satyanarayan Dayama, Bangalore (IN); Mukundan Sundararajan, Bangalore (IN); Neha Shah, Kolkata (IN); Arindam Dasgupta, Kolkata (IN); Suman Das, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 134 days.

(21) Appl. No.: 17/342,607

(22) Filed: Jun. 9, 2021

(65) Prior Publication Data
US 2022/0400368 A1    Dec. 15, 2022

(51) Int. Cl.
*H04W 8/18*    (2009.01)
*H04M 15/00*    (2006.01)
(Continued)

(52) U.S. Cl.
CPC ............. *H04W 8/18* (2013.01); *H04M 15/50* (2013.01); *H04M 15/8038* (2013.01);
(Continued)

(58) Field of Classification Search
CPC ......... H04W 8/18; H04W 4/24; H04W 12/02; H04M 15/50; H04M 15/8038;
(Continued)

(56) References Cited

U.S. PATENT DOCUMENTS 10,587,760 B1 *    3/2020    Paran ................... H04L 9/3239
11,068,464 B2 *    7/2021    Swope .................. H04L 9/0637
(Continued)

FOREIGN PATENT DOCUMENTS

EP           3579494 A1    12/2019
KR    20200071564 A     6/2020
(Continued)

OTHER PUBLICATIONS

Xue, Kaiping, et al. "A blockchain based user subscription data management and access control scheme in mobile communication networks." IEEE Transactions on Vehicular Technology 71.3 (2021): 3108-3120. (Year: 2021).*
(Continued)

*Primary Examiner* — Sharad Rampuria
(74) *Attorney, Agent, or Firm* — Schmeiser, Olsen & Watts, LLP; Michael A. Petrocelli

(57) ABSTRACT

A method, system, and computer program product for implementing mobile device roaming optimization is provided. The method includes receiving a selection for services associated with a first mobile device provider for activation during travel to a location associated with mobile device roaming attributes with respect to a mobile device of a user. A blockchain structure and a hash masking sensitive data of the user are generated. It is detected that the user and mobile device have traveled to the location and access to the blockchain structure is enabled. Roaming usage attributes of the mobile device are determined. Subsequently, operational functionality of the mobile device at the geographical location is enabled via roaming usage of a network of the second mobile device provider and second hash of consumption related information compliant with data residency is transmitted to the first mobile device provider to facilitate resolution of disputes across entities.

17 Claims, 8 Drawing Sheets

(51) Int. Cl.
H04W 12/02 (2009.01)
H04W 4/24 (2018.01)
(52) U.S. Cl.
CPC .............. *H04M 15/82* (2013.01); *H04W 4/24* (2013.01); *H04W 12/02* (2013.01)
(58) Field of Classification Search
CPC .. H04M 15/82; H04M 15/00; H04M 2215/32; H04M 2215/2026; H04M 17/00
See application file for complete search history.

(56) References Cited

U.S. PATENT DOCUMENTS

| | | | |
|---|---|---|---|
| 11,122,500 B2* | 9/2021 | Salgueiro | H04L 9/3297 |
| 2019/0303807 A1* | 10/2019 | Gueye | G06Q 20/3224 |
| 2019/0380031 A1 | 12/2019 | Suthar | |
| 2021/0089637 A1* | 3/2021 | Cummins | H04W 12/68 |

FOREIGN PATENT DOCUMENTS

| | | |
|---|---|---|
| WO | WO2018071798 A1 | 4/2018 |
| WO | WO2021089035 A1 | 5/2021 |

OTHER PUBLICATIONS

Mafakheri, Babak, et al. "Smart contracts in the 5G roaming architecture: the fusion of blockchain with 5G networks." IEEE Communications Magazine 59.3 (2021): 77-83. (Year: 2021).*

Babu, Arun et al.; How Blockchain can impact the telecommunications industry; Monitor Deloitte; https://www2.deloitte.com/content/dam/Deloitte/za/Documents/technology-media-telecommunications/za_TMT_Blockchain_TelCo.pdf; retrieved from the Internet May 26, 2021; 13 pages.

Cui, Yuqing; Application of Zero-Knowledge Proof in Resolving Disputes of Privileged Documents in e-Discovery; Harvard Journal of Law & Technology, vol. 32, No. 2; Spring 2091; 23 pages.

Darmwal, Rahul; Blockchain in Telecom Sector: An Analysis of Potential Use Cases; https://search.proquest.com/openview/566e5886856e6e33763f252e51a1c2ac/1?pq-origsite=gscholar&cbl=2043509; retrieved from the Internet May 26, 2021; 1 page.

Design is Dead; Blockchain in Telecom; https://a.storyblok.com/f/44470/x/a8a31101fe/telco_roaming_shortpaper_did.pdf; retrieved from the Internet Jan. 13, 2021; 9 pages.

Determan, Lotharo et al.; Residency Requirements for Data in Clouds-What Now?; Privacy & Security Law Report; 14 PVLR 269; Feb. 16, 2015; 5 pages.

Eskandari, Mojtaba; Smartphone Data Transfer Protection According to Jurisdiction Regulations; Thesis submitted to the Department of Information Engineering and Computer Science, ICT International Doctoral School, University of Trento, Italy; Jan. 31, 2017; 128 pages.

Flanagan, Anne Josephine et al.; A Roadmap for Cross-Border Data Flows: Future-Proofing Readiness and Cooperation in the New Data Economy; White Paper Jun. 2020; 50 pages.

Hippelainen, Leo et al.; Towards Trusted Location Specific Information for Cloud Servers; Journal of ICT Standardization, vol. 5, Issue 1; Jul. 2017; 38 pages.

IBM Cloud; IBM Clockchain Platform for IBM Cloud; https://cloud.ibm.com/docs/blockchain?topic=blockchain-console-icp-about-data-residency; Retrieved from the Internet May 26, 2021; 12 pages.

Idamakanti, Charishma et al.; Catering The Telecom Conundrum of Revenue Leakage: Blockchain—A Business Paradigm; International Journal of Engineering Technology Science and Research; vol. 4, Issue 10; Oct. 2017; 14 pages.

Kousalya, k. et al.; A Survey on Privacy Preserving in Roaming Network; International Journal of Computer Science and Information Technologies, vol. 5 (6); 2014; pp. 7118-7121.

Par, Dr. Riad Hartani; Convergence between the Internet and Space: Challenges and Opportunities; LTE Magazine; Mar. 2, 2020; ; 5 pages.

Refaey, Ahmet et al.; A Blockchain Policy and Charging Control Framework for Roaming in Cellular NetworksarXiv:1906.06350v1; Jun. 4, 2019; 7 pages.

Sundarraman, Arvind; Assuring Success in Blockchain Implementations by Engineering Quality in Validation; White Paper—Infosys; 2018; 8 pages.

Wan, Zhiguo et al.; A Secure Privacy-Preserving Roaming Protocol Based on Hierarchical Identity-Based Encryption for Mobile Networks; Proceedings of the First ACM Conference on Wireless Network Security, WISEC 2008; Mar. 31-Apr. 2, 2008; 6 pages.

Mell, Peter et al.; "The NIST Definition of Cloud Computing;" National Institute of Standards and Technology; Special Publication 800-145; Sep. 2011; 7 pages.

Yury Morozov, Global Telecom Ecosystem Without Intermediaries: Smart Contracts Allow Direct Interaction Between Mobile Operators, Subscribers and Service Providers, Bubbletone Blockchain, Jan. 31, 2018, XP055517320, Retrieved from the Internet on Oct. 19, 2018: URL: https:// bubbletone.io/BubbleTOne_Whitepaper_ENG-Jan18, 36 pages.

ISR dated Oct. 5, 2022, International application No. PCT/EP2022/065358, International filing date Jun. 7, 2022, 16 pages.

* cited by examiner

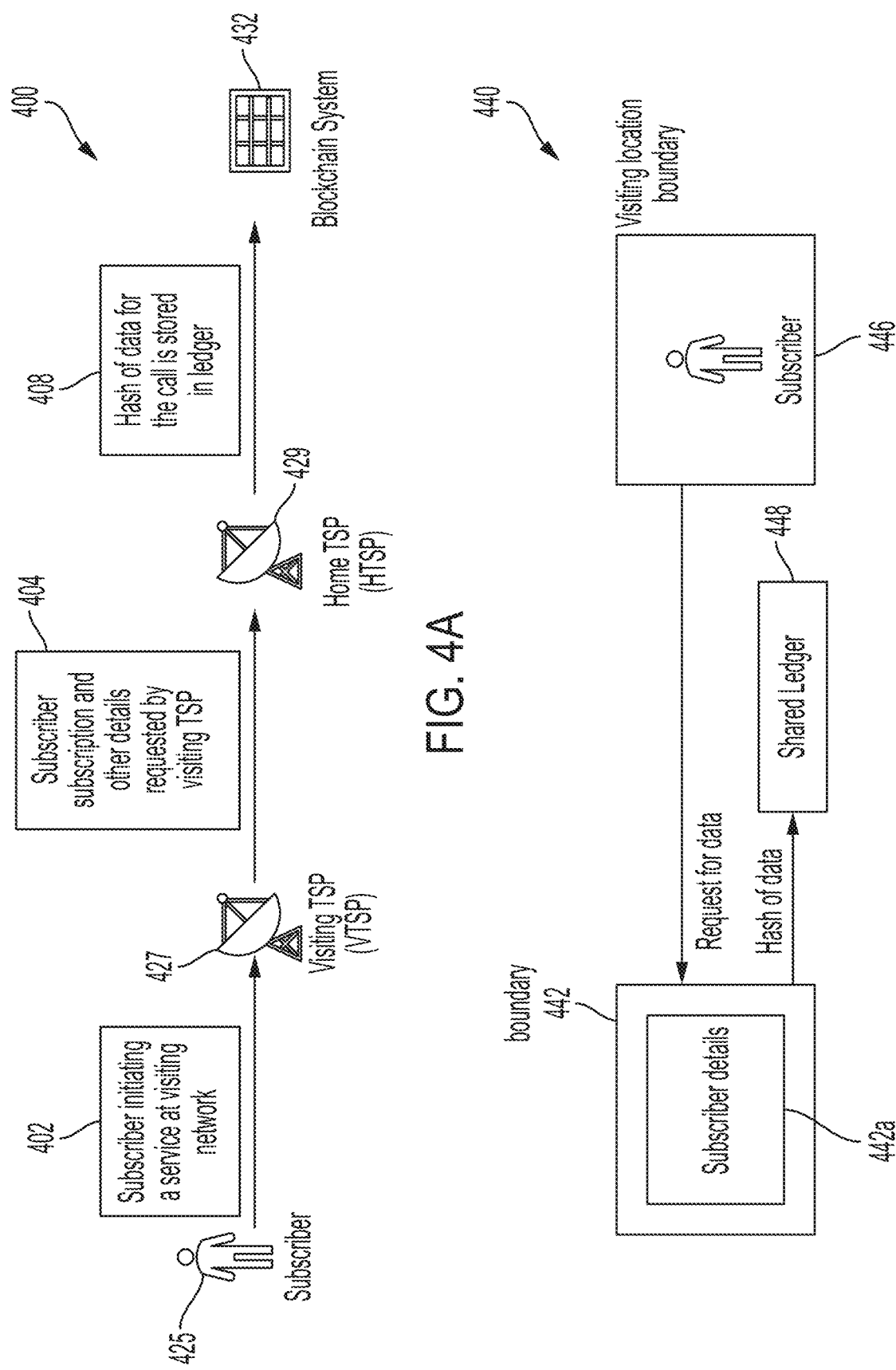

MOBILE DEVICE ROAMING OPTIMIZATION AND OPERATION

BACKGROUND

The present invention relates generally to a method for optimizing mobile device roaming and optimization and in particular to a method and associated system for improving mobile device and software technology.

SUMMARY

A first aspect of the invention provides a remote mobile device roaming optimization method comprising: receiving, by a processor of a hardware device from a user, a selection for specified services associated with a first mobile device provider for activation during travel to a specified geographical location associated with mobile device roaming attributes with respect to a mobile device of the user; generating, by the processor, a blockchain structure comprising details associated with the specified services; generating, by the processor, a first hash masking sensitive data of the user within the blockchain structure; detecting, by the processor via a plurality of sensors, that the user and the mobile device have traveled from an initial residence location to the specified geographical location; enabling for a second mobile device provider, by the processor in response to results of the detecting, access, via the first hash, to the details of the blockchain structure; analyzing, by the processor via the blockchain structure, common attributes between the first mobile device provider and the second mobile device provider; determining, by the processor in response to results of the analyzing, usage attributes associated with roaming usage of the mobile device at the specified geographical location with respect to the first mobile device provider and the second mobile device provider; and enabling, by the processor in response to the determining, operational functionality of the mobile device at the specified geographical location via roaming usage of a network of the second mobile device provider.

A second aspect of the invention provides a computer program product, comprising a computer readable hardware storage device storing a computer readable program code, the computer readable program code comprising an algorithm that when executed by a processor of hardware device implements a remote mobile device roaming optimization method, the method comprising: receiving, by the processor from a user, a selection for specified services associated with a first mobile device provider for activation during travel to a specified geographical location associated with mobile device roaming attributes with respect to a mobile device of the user; generating, by the processor, a blockchain structure comprising details associated with the specified services; generating, by the processor, a first hash masking sensitive data of the user within the blockchain structure; detecting, by the processor via a plurality of sensors, that the user and the mobile device have traveled from an initial residence location to the specified geographical location; enabling for a second mobile device provider, by the processor in response to results of the detecting, access, via the first hash, to the details of the blockchain structure; analyzing, by the processor via the blockchain structure, common attributes between the first mobile device provider and the second mobile device provider; determining, by the processor in response to results of the analyzing, usage attributes associated with roaming usage of the mobile device at the specified geographical location with respect to the first mobile device provider and the second mobile device provider; and enabling, by the processor in response to the determining, operational functionality of the mobile device at the specified geographical location via roaming usage of a network of the second mobile device provider.

A third aspect of the invention provides a hardware device comprising a processor coupled to a computer-readable memory unit, the memory unit comprising instructions that when executed by the computer processor implements a remote mobile device roaming optimization method comprising: receiving, by the processor from a user, a selection for specified services associated with a first mobile device provider for activation during travel to a specified geographical location associated with mobile device roaming attributes with respect to a mobile device of the user; generating, by the processor, a blockchain structure comprising details associated with the specified services; generating, by the processor, a first hash masking sensitive data of the user within the blockchain structure; detecting, by the processor via a plurality of sensors, that the user and the mobile device have traveled from an initial residence location to the specified geographical location; enabling for a second mobile device provider, by the processor in response to results of the detecting, access, via the first hash, to the details of the blockchain structure; analyzing, by the processor via the blockchain structure, common attributes between the first mobile device provider and the second mobile device provider; determining, by the processor in response to results of the analyzing, usage attributes associated with roaming usage of the mobile device at the specified geographical location with respect to the first mobile device provider and the second mobile device provider; and enabling, by the processor in response to the determining, operational functionality of the mobile device at the specified geographical location via roaming usage of a network of the second mobile device provider.

The present invention advantageously provides a simple method and associated system capable of optimizing remote mobile device roaming.

BRIEF DESCRIPTION OF THE DRAWINGS

FIG. 4A illustrates a hash storage process enabled by the system of FIG. 1, in accordance with embodiments of the present invention.

FIG. 4B illustrates a resulting system associated with the hash storage process of FIG. 4A, in accordance with embodiments of the present invention.

DETAILED DESCRIPTION

Figure 1:
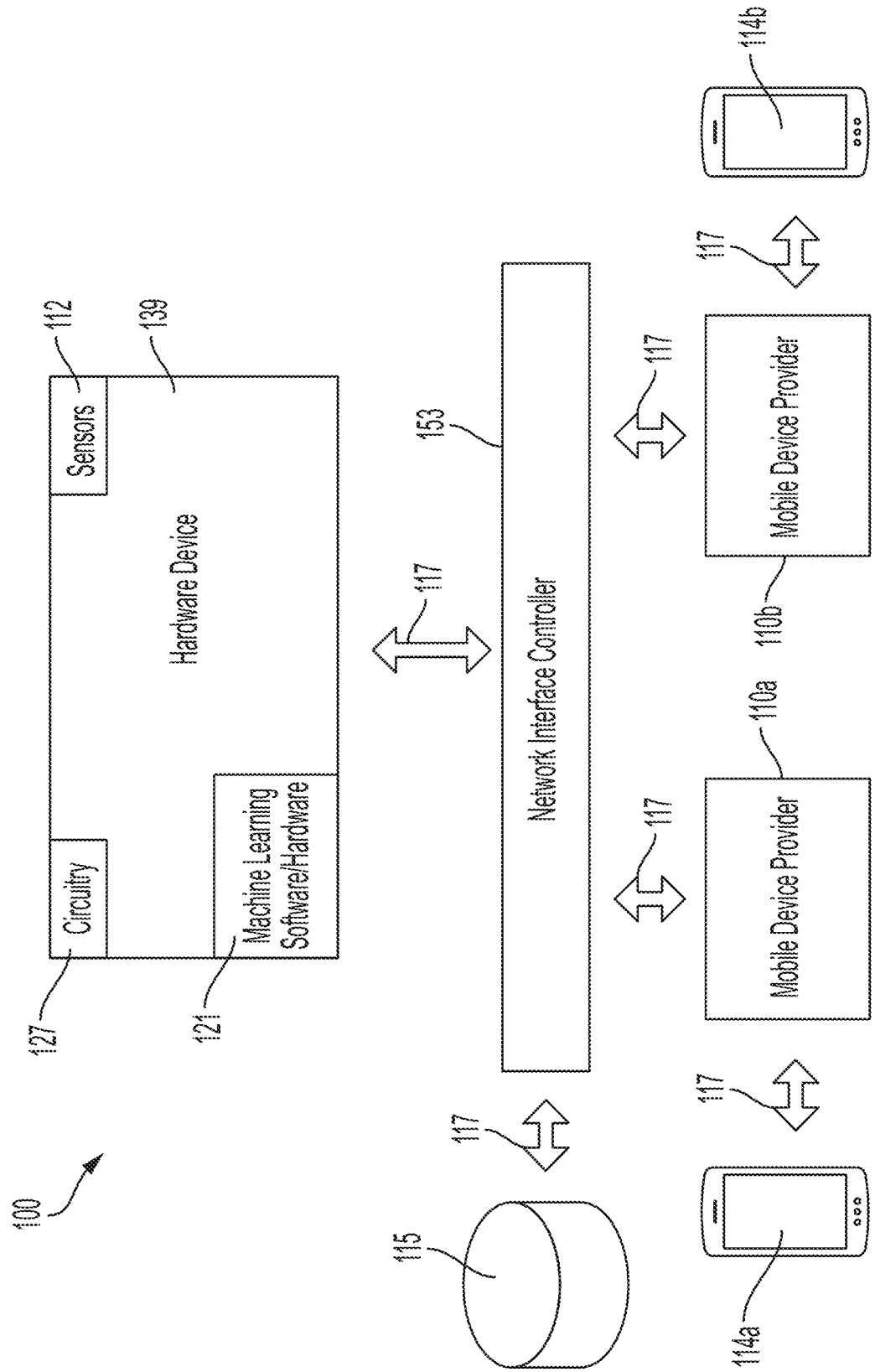
FIG. 1 illustrates a system for improving mobile device and software technology associated with generating a blockchain structure and associated hash masking details associated with specified services, analyzing common attributes between mobile device providers, determining usage attributes associated with roaming usage of a mobile device with respect to the mobile device providers, and enabling operational functionality of the mobile device at via roaming usage of a network of one of the mobile device providers, in accordance with embodiments of the present invention.

FIG. 1 illustrates a system 100 for improving mobile device and software technology associated with generating a blockchain structure and associated hash masking details associated with specified services, analyzing common attributes between mobile device providers, determining usage attributes associated with roaming usage of a mobile device with respect to the mobile device providers, and enabling operational functionality of the mobile device at via roaming usage of a network of one of the mobile device providers, in accordance with embodiments of the present invention. A typical mobile call roaming process enables a user to travel to a location outside of its geographical (e.g., country) border/location and use telecom services via a connection to a visiting telecom operator network. Likewise, a typical mobile call roaming process allows for a collaboration between a home based telecom operator network (HPMN) and a visiting operator telecom provider network (VPMN) thereby resulting in a large number of settlement operations executed between the telecom operator networks. Associated data is exchanged between the telecom operator networks during a service usage process (executed via customers) and during settlements between the telecom operator networks. Typical data exchange processes may comprise a third party data clearing house for handling a settlement of billing between the telecom operator networks. Associated data may be transferred between the VPMN and HPMN (via a data clearing house) in a file based format such as a transferred account procedure (TAP). Therefore, system 100 enables a blockchain based solution for eliminating a data clearing house thereby enabling a reduction in a cost associated with a settlement of an amount in combination with a faster resolution. Additionally, system 100 is configured to reduce a chance for data tampering and fraudulent activities.

Typical data call roaming solutions provide cost reductions associated with invoice settlements but hinder a data residency aspect thereby constraining movement of data across borders. For example, service usage and billing rate data are used for authentication processes resulting in data (e.g., subscriber (user) subscription information, subscriber identity information via shared ledger, etc.) being shared between telecom operator networks which may be used to automatically define a usage/rate boundary of a subscriber via predefined rules. Likewise, a user travelling to a different (from a home region) region may enable use of a service such as access to a location via authentication with respect to a payment mechanism thereby requiring user data to be available at the location of service utilization. Actual services used and associated payment details are required to be bound to a visiting location. Associated information may have restricted availability with respect to a home location. Therefore, a process for resolving a conflict at a home location relating to services used by a subscriber may be implemented via a color coding process used to define different dimensions of services thereby masking actual data related to services while providing information required to handle conflicts. Furthermore, an authorization level of a subscriber (at a visiting location) using a service may be identified via a color scheme (instead of subscription information sharing). For example, a subscriber may be identified as associated with a hotel comprising multiple locations. The subscriber (at a visiting location) may attempt to access a service provided by a hotel (e.g., requesting access to the premise and utilize an associated food service available to members only). In response, the visiting location (hotel) may require information associated with the subscriber (e.g., service access attributes). Therefore, different levels of service may comprise different color tokens to identify the services a subscriber may access in combination with subscriber authentication. A multi-level color token system acting as a control mechanism in combination with subscriber initiated authentication may enable the subscriber to access the service. Likewise (at a home location) a multi-level color token and proof of authentication system, may enable a home operator to settle an invoice with a subscriber and with a visiting operator without actual data sharing and conflicts. Therefore system 100 is configured to execute a code implemented process for enabling billing integrity for mobile device roaming customers and service providers while complying with legal regulations with respect to data residency as follows:

1. Maintaining privacy of data by grounding a data hash with respect to a distributed ledger while actual data is stored within a private data as per a data residency requirement 2. Illustrating a correctness of a bill generated for customers without sharing sensitive data with a visiting telecom service prover (VTSP) or usage data with a home telecom service prover (HTSP).

3. Illustrating a correct settlement between the two operators (HTSP and VTSP) without sharing of data by the VTSP.

System 100 is further configured to:

1. Ensure compliance of data residency and personal data exchange in cross border scenarios.

2. Resolve billing integrity issues arising due to data residency & usage in cross border transactions.

3. Ensure correctness of a bill generated for customers without sharing a data plan with a VTSP or usage data with a HTSP.

4. Ensure compliance of data residency & personal data exchange during a process for consuming edge services such as visual consent identity services associated with data exchange during edge service consumption and cross border transactions.

Therefore, system 100 is configured to enable token and sub-token definitions required for final settlement as follows:

A data grounding step is initiated such that an HTSP generates a hash masking a service plan with respect to a customer and ledger (e.g., token types, function of charge computation, etc.). Additionally, the HTSP generates a hash masking an agreement with an VTSP (e.g., token types, charge computation logic, etc.). Subsequently, a VTSP provider generates a hash masking data usage of a customer with respect to a ledger (e.g., token types, quantity, etc.). Additionally, parties may endorse the aforementioned hashes. A corrected bill generation step is further executed for a customer such that a customer self generates a bill without proof that the bill is consistent with the aforementioned hashes. Likewise, the corrected bill generation step may be executed by the VTSP with respect to the HTSP such that the VTSP generates a bill for the HTSP that is consistent with the aforementioned hashes.

System 100 of FIG. 1 includes a hardware device 139, mobile device provider systems 110*a* and 110*b*, mobile devices 114*a* and 114*b*, a database 115, and a network interface controller 153 interconnected through a network 7. Server hardware device 139 includes specialized circuitry 127 (that may include specialized software), sensors 112, and machine learning software code/hardware structure 121 (i.e., including machine learning software code). Network interface controller 153 may include any type of device or apparatus for securely interfacing hardware and software to a network. Mobile device providers 110*a* and 110*b* comprise remote systems for enabling mobile device services for mobile devices within differing geographical regions. Mobile devices 114*a* and 114*b* comprise any type of mobile communication device including, inter alia, a smart phone, a PDA, a laptop computer, an Internet of Things device, etc. Hardware device 139 and mobile device provider systems 110*a* and 110*b* each may comprise an embedded device(s). An embedded device is defined herein as a dedicated device or computer comprising a combination of computer hardware and software (fixed in capability or programmable) specifically designed for executing a specialized function. Programmable embedded computers or devices may comprise specialized programming interfaces. In one embodiment, hardware device 139 and mobile device provider systems 110*a* and 110*b* may each comprise a specialized hardware device comprising specialized (non-generic) hardware and circuitry (i.e., specialized discrete non-generic analog, digital, and logic-based circuitry) for (independently or in combination) executing a process described with respect to FIGS. 1-8. The specialized discrete non-generic analog, digital, and logic-based circuitry (e.g., circuitry 127, sensors 112, and machine learning software/hardware 121, etc.) may include proprietary specially designed components (e.g., a specialized integrated circuit, such as for example an Application Specific Integrated Circuit (ASIC) designed for only implementing an automated process for improving mobile device and software technology associated with generating a blockchain structure and associated hash masking details associated with specified services, analyzing common attributes between mobile device providers, determining usage attributes associated with roaming usage of a mobile device with respect to the mobile device providers, and enabling operational functionality of the mobile device at via roaming usage of a network of one of the mobile device providers. Sensors 112 may include any type of internal or external sensors including, inter alia, GPS sensors, Bluetooth beaconing sensors, cellular telephone detection sensors, Wi-Fi positioning detection sensors, triangulation detection sensors, activity tracking sensors, a temperature sensor, an ultrasonic sensor, an optical sensor, a video retrieval device, humidity sensors, voltage sensors, network traffic sensors, etc. Network 7 may include any type of network including, inter alia, a local area network, (LAN), a wide area network (WAN), the Internet, a wireless network, etc.

System 100 is enabled to execute a remote mobile device roaming optimization process via execution of blockchain and hash structures as follows:

The process is initiated when a user registers with a home telecom service provider to set-up an associated account and services. Likewise, the user may provide customer information applicable in each geographical location (e.g., country). Additionally, the user may sign up for several value-added services requiring user preference selections and key data associated with the customer. Subsequently (when the user is planning to travel to another country), the user may subscribe to a roaming package from the home telecom service provider. Therefore, the user may select services (including base and value-added services) for execution during a duration of roaming. In response, the home telecom service provider initiates the account and contract details (e.g., roaming) as a blockchain structure and obtains a hash structure including the user's personal details, services subscribed, etc. A color coding scheme may be implemented to represent a level of information shared for a service.

When the user travels to a new country and enables a roaming pack, the visiting telecom service provider accesses contract details from the blockchain structure (provided by the home telecom service provider) as a hash structure in a shared ledger. The blockchain structure is configured to automatically analyze a contract between the home telecom service provider and a visiting telecom service provider with respect to predefined rules, a value/boundary for usage for the subscriber with respect to the contract. System 100 allows subscription information, a subscriber's identity, and a usage limit based on the subscription with the home telecom service provider to be made available to the visiting telecom service provider. Subsequently (when the user reaches threshold of limit of usage based on a roaming subscription contract with the home telecom service provider), the visiting telecom service provider is enabled to obtain information from the blockchain structure and associated hash structure and notify the subscriber that a roaming limit has been exceeded. Accessed information is protected by the visiting telecom service provider based on local in-country data protection regulations stored within a private database (e.g., database 115 in FIG. 1). Actual services used and associated payment details are bound to the visiting geographical location and are associated with data residency rules. Likewise (with respect to resolution of a billing conflict), the visiting telecom service provider generates a hash structure masking usage charges for the home telecom service provider. Likewise, the user may consume several other services requiring different levels of information associated with the user and corresponding transactions are stored within the blockchain structure thereby protecting local or user information (as needed for data regulations) for compliance with data residency rules. A color coding mechanism may be enabled for tagging transactions for easy identification via the hash structure. The visiting telecom service provider may store a color code to indicate subscriber used services. The color code may be placed within the hash structure. The following implementation example is associated with a user as a subscribed member of a multinational hotel program for access to specified services (e.g., an exercise gym, a pool, etc.) as follows:

The process is initiated when the user provides identification for service authentication. The services are registered within the roaming contract such that when the user accesses the services via their mobile device, a visiting telecom service provider submits a request for user related information obtained from a hash structure within a shared ledger. Subsequently, the user consumes the services and the visiting telecom service provider registers the associated transaction and attaches a color code schema to transaction information and a service price within the hash structure provided by visiting telecom service provider to the home telecom service provider. Additionally, the user orders food from a global food chain and identifies themselves for the order delivery (i.e., a peer to the visiting telecom service provider) with a same mobile based service they use at a home location. Shared information is labeled via a color code identifier used as a tag by the visiting telecom service provider with respect to the hash structure. When the user returns home a bill is generated for services consumed in the visiting location. The bill illustrates the color codes associated with different transactions and associated price, etc. The user is enabled to track through the tags to determine what information has been exchanged and when the service was consumed. The home telecom service provider uses this information to bill the user and settle fees with the visiting telecom service provider. If the user locates a dispute with respect to a specified service as a paid service (e.g., using specialized equipment in the gym) via the color code schema, the home telecom service provider may be configured to track a transaction with respect to the service usage provided to the user for acceptance of the service price. The visiting telecom service provider may charge the home telecom service provider for usage costs beyond a normal limit at a premium price. A blockchain contract (associated with the blockchain structure) contains a limit associated with the home telecom service provider. A resulting dispute may be easily resolved by the home telecom service provider via analysis of the blockchain. Likewise, the visiting telecom service provider may generate charges for various services consumed via analysis of the hash structure shared with the home telecom service provider. The visiting telecom service provider may additionally generate a cross-charge bill for the home telecom service provider. The aforementioned functionality may be independent from different benefits that the home telecom service provider may provide to the user and which may not be passed on to the user when the user requests the bill from the home telecom service provider.

The following first scenario is associated with a protocol for resolving a billing dispute associated with a customer self-generating a roaming bill based on private data associated with a consumption of services. The first scenario is initiated when a customer signs a roaming contract with a home telecom service provider. In response, the customer utilizes different services at a roaming destination and the customer self-computes a bill and initiates a payment. The aforementioned first scenario enables protection for customer usage data and any billing disputes may be resolved without revealing any private data.

The following second scenario is associated with a protocol for resolving a billing dispute associated with a VSTP self-generating a bill for HTSP based on user data consumption. The second scenario is initiated when a VTSP roaming contract with home telecom service provider is executed and a customer utilizes different services at a roaming destination. In response, the VTSP self-computes a bill and HTSP initiates a payment. The aforementioned second scenario enables protection for customer usage data and any billing disputes may be resolved without revealing any private data.

Figure 2:
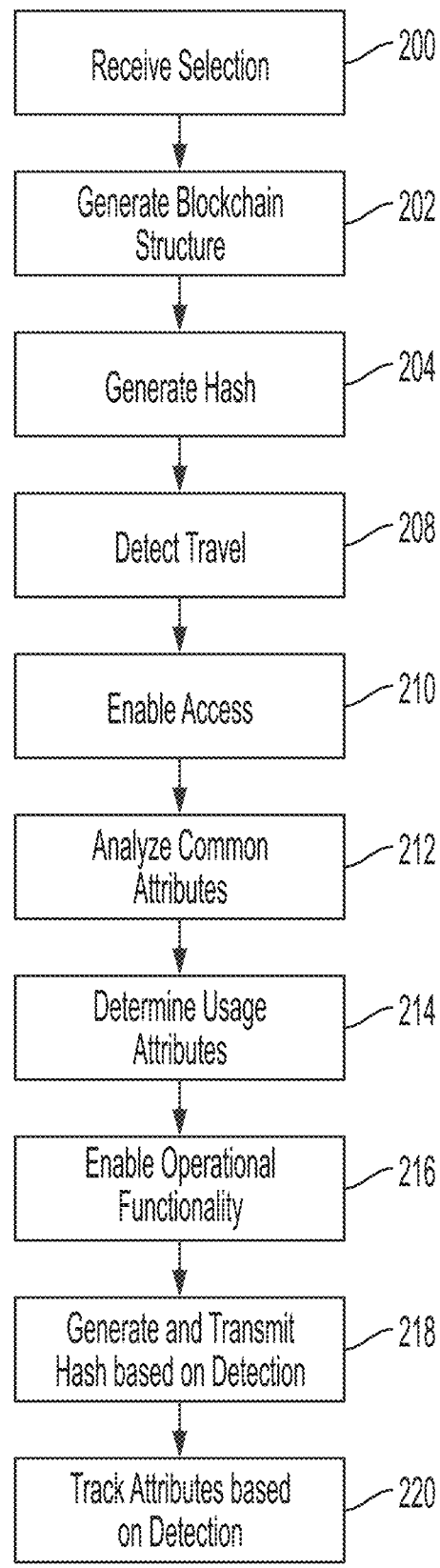
FIG. 2 illustrates an algorithm detailing a process flow enabled by the system of FIG. 1 for improving mobile device and software technology associated with generating a blockchain structure and associated hash masking details associated with specified services, analyzing common attributes between mobile device providers, determining usage attributes associated with roaming usage of a mobile device with respect to the mobile device providers, and enabling operational functionality of the mobile device at via roaming usage of a network of one of the mobile device providers, in accordance with embodiments of the present invention.

FIG. 2 illustrates an algorithm detailing a process flow enabled by system 100 of FIG. 1 for improving mobile device and software technology associated with generating a blockchain structure and associated hash masking details associated with specified services; analyzing common attributes between mobile device providers; determining usage attributes associated with roaming usage of a mobile device with respect to the mobile device providers; and enabling operational functionality of the mobile device at via roaming usage of a network of one of the mobile device providers, in accordance with embodiments of the present invention. Each of the steps in the algorithm of FIG. 2 may be enabled and executed in any order by a computer processor(s) executing computer code. Additionally, each of the steps in the algorithm of FIG. 2 may be enabled and executed in combination by hardware device 139, mobile device provider systems 110a and 110b, and mobile devices 114a and 114b of FIG. 1. In step 200, a selection for specified services associated with a first mobile device provider is received for activation during travel to a specified geographical location associated with mobile device roaming attributes with respect to a mobile device of a user. The hardware device may be located at a remote location with respect to locations of the mobile device, the first mobile device provider, and/or the second mobile device provider.

In step 202, a blockchain structure comprising details associated with the specified services is generated. In step 204, a first hash is generated. The first hash is configured to mask sensitive data of the user within the blockchain structure. In step 208, a plurality of sensors detects that the user and mobile device have traveled from an initial residence location to the specified geographical location. In step 210, access to details of the blockchain structure is enabled for a second mobile device provider. The access is enabled (via the first hash) in response to results of the detection. In step 212, common attributes between the first mobile device provider and the second mobile device provider are analyzed via the blockchain structure. In step 214, usage attributes are determined in response to results of the analysis of step 212. The usage attributes are associated with roaming usage of the mobile device at the specified geographical location with respect to the first mobile device provider and second mobile device provider. In step 216, operational functionality of the mobile device at the specified geographical location is enabled via roaming usage of a network of the second mobile device provider in response to step 214.

In step 218, it is detected that the mobile device has exceeded a usage threshold associated with the roaming attributes with respect to a contract between the user and the first mobile device provider. In response, a second hash is generated. The second hash masks residency related sensitive data of the user and indicates that the mobile device has exceeded the usage threshold. Subsequently, the second hash is transmitted to the first service provider. Alternatively (in step 218), it is detected that the mobile device has accessed additional services during the roaming usage. In response, a second hash is generated. The second hash indicates that the mobile device has accessed additional services. Subsequently, the second hash is transmitted to the first service provider.

In step 220, it is detected (via sensors) that the user and mobile device have traveled from the specified geographical location back to the initial residence location and contract attributes are tracked via digital tags. The contract attributes are associated with the first service provider with respect to the roaming usage. Results of the tracking process may be used to determine a dispute associated with services enabled during the roaming usage such that terms of the contract attributes may be modified. Additionally or alternatively, results of the tracking process may be used to determine a dispute associated with compensation attributes associated with the roaming usage such that terms of the contract attributes may be modified. Additionally, the first hash and second hash may be analyzed and compensation attributes associated with the roaming usage may be generated. Likewise, class indicators may be generated. The class indicators are associated with shared user information with respect to the roaming usage for enabling ease of consumption correlation actions.

Figure 3:
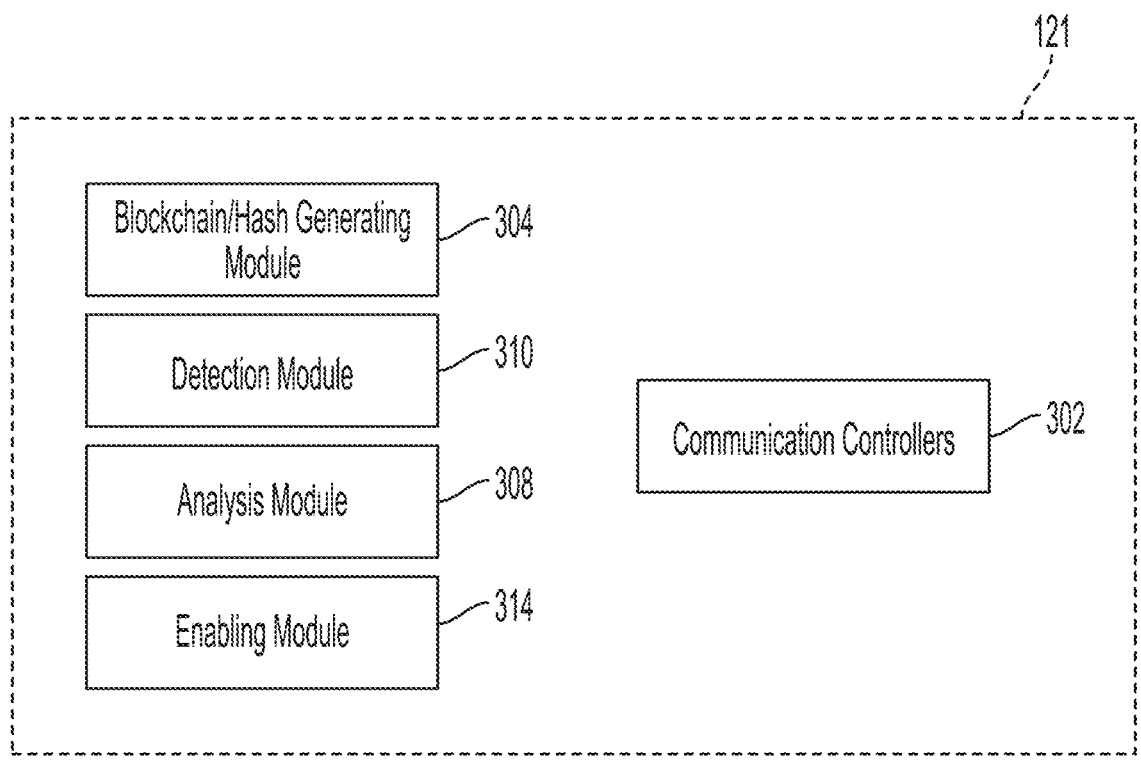
FIG. 3 illustrates an internal structural view of the machine learning software/hardware of FIG. 1, in accordance with embodiments of the present invention.

FIG. 3 illustrates an internal structural view of machine learning software/hardware 121 (and/or the circuitry 127) of FIG. 1, in accordance with embodiments of the present invention. Machine learning software/hardware 121 includes a blockchain/hash generating module 304, a detection module 310, an analysis module 308, an enabling module 314, and communication controllers 302. Blockchain/hash generating module 304 comprises specialized hardware and software for controlling all functions related to generating blockchain and hash structures. Detection module 310 comprises specialized hardware and software for controlling all functionality related to the detection steps described with respect to the algorithm of FIG. 2. Analysis module 308 comprises specialized hardware and software for controlling all functions related to the analysis steps of FIG. 2. Enabling module 314 comprises specialized hardware and software for controlling all functions related to the enabling steps of the algorithm of FIG. 2. Communication controllers 302 are enabled for controlling all communications between blockchain/hash generating module 304, detection module 310, analysis module 308, and enabling module 314.

FIG. 4A illustrates a hash storage process 400 enabled by system 100 of FIG. 1, in accordance with embodiments of the present invention. Hash storage process 400 enables a hash of data (e.g., a contract between HPMN and subscriber, a contract between HPMN and VPMN, a rule set, subscription identification, etc.) to be stores instead of the actual data with a ledger. In step 402, a subscriber 425 initiates a service at a VTSP 427. In step 404, VTSB 427 requests subscriber subscription information from a HTSP 429. In step 408, a hash structure of the subscriber subscription information and associated communication is generated with respect to a blockchain system 432. The hash structure is stored within a ledger.

FIG. 4B illustrates a resulting system 440 associated with hash storage process 400 of FIG. 4A, in accordance with embodiments of the present invention. System 440 illustrates that actual data (subscriber details) 442a is not shared and therefore remains within a boundary 442. Likewise, a hash of the data is stored within a shared ledger 448. Resulting system 440 is initiated when a subscriber within a visiting location boundary 446 initiates a request for data.

Figure 5A:
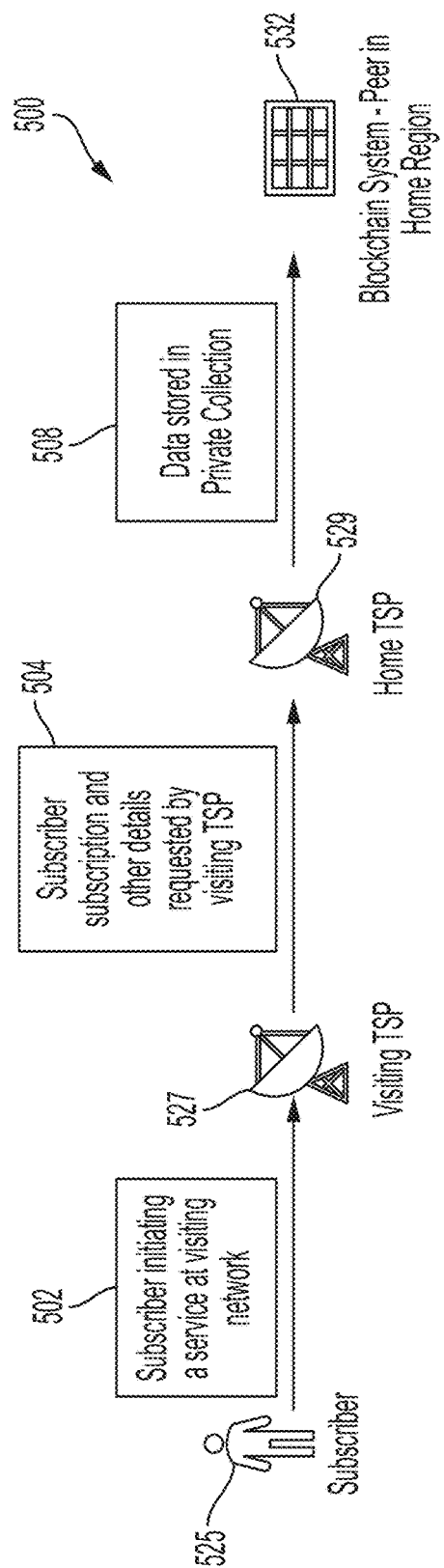
FIG. 5A illustrates a private data storage process enabled by the system of FIG. 1, in accordance with embodiments of the present invention.

FIG. 5A illustrates private data storage process 500 enabled by system 100 of FIG. 1, in accordance with embodiments of the present invention. Private data storage process 500 enables storage of data within a private collection (database) such that a participating peer is located within a home region. In step 502, a subscriber 525 initiates a service at a VTSP 527. In step 504, VTSB 527 requests subscriber subscription information from a HTSP 529. In step 508, data associated with the subscriber subscription information with respect to a blockchain system 532 is stored within a private collection database.

Figure 5B:
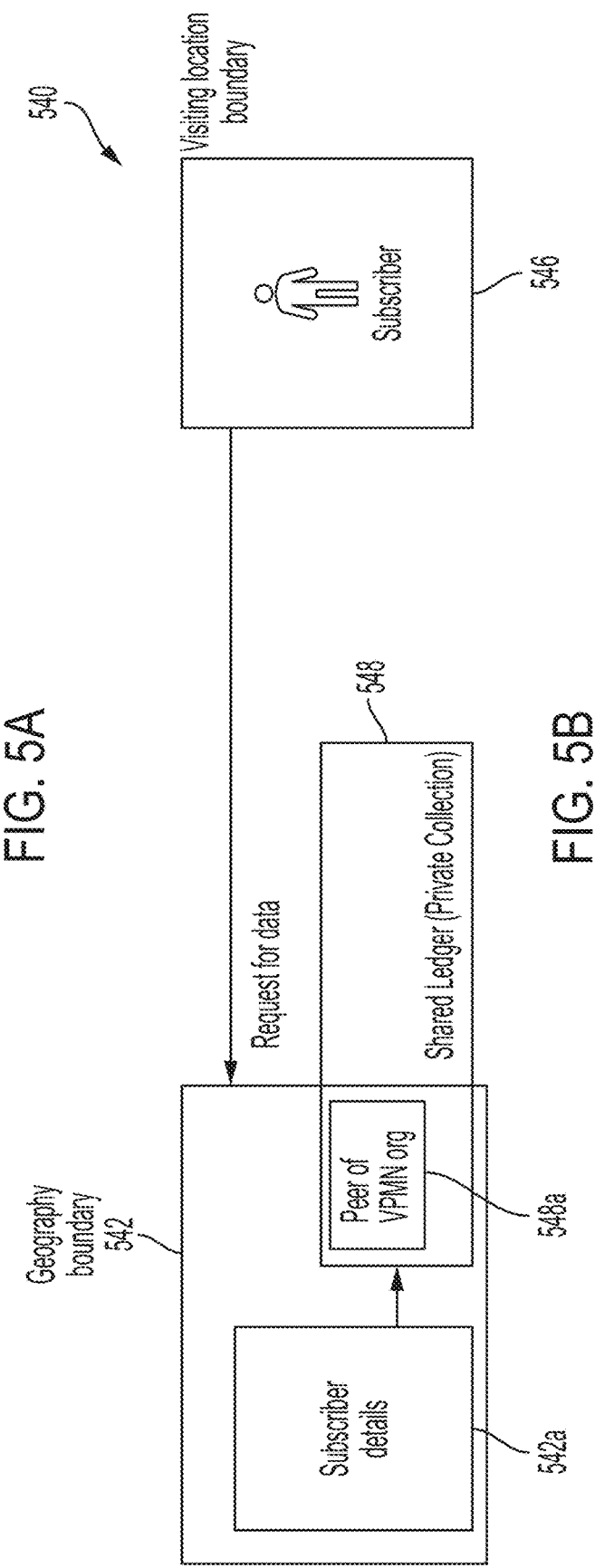
FIG. 5B illustrates a resulting system associated with the private data storage process of FIG. 5A, in accordance with embodiments of the present invention.

FIG. 5B illustrates a resulting system 540 associated with private data storage process 500 of FIG. 5A, in accordance with embodiments of the present invention. Private data storage process 500 enables data (i.e., subscriber details 542a) to remain within home boundary 542 as the data is stored as a private collection 548 available to participating peers 548a only. A peer location is restricted to home region (i.e., home boundary 542). Resulting system 540 is initiated when a subscriber within a visiting location boundary 546 initiates a request for data.

Figure 6:
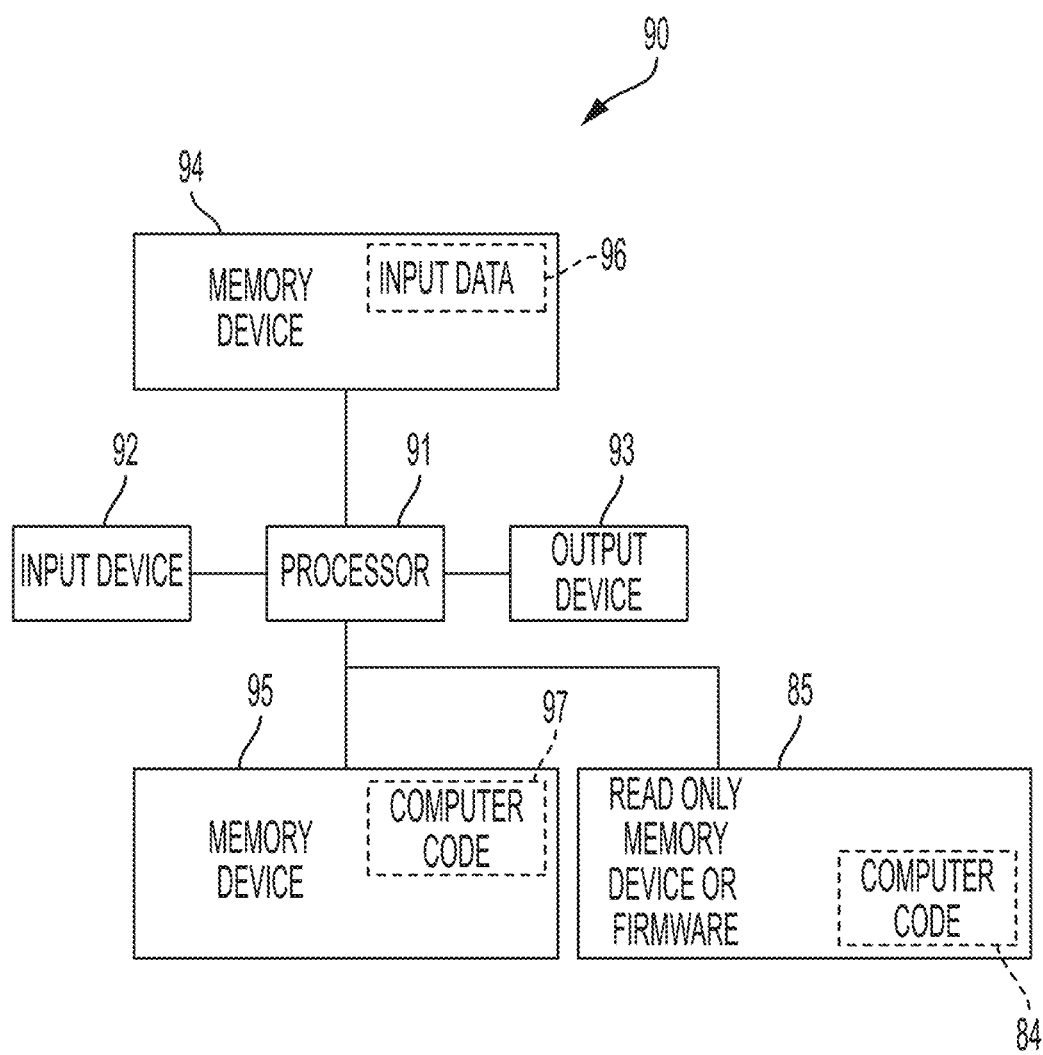
FIG. 6 illustrates a computer system used by the system of FIG. 1 for improving mobile device and software technology associated with generating a blockchain structure and associated hash masking details associated with specified services, analyzing common attributes between mobile device providers, determining usage attributes associated with roaming usage of a mobile device with respect to the mobile device providers, and enabling operational functionality of the mobile device at via roaming usage of a network of one of the mobile device providers, in accordance with embodiments of the present invention.

FIG. 6 illustrates a computer system 90 (e.g., hardware device 139 and mobile device providers (systems) 110a and 110b of FIG. 1) used by or comprised by the system 100 of FIG. 1 for improving mobile device and software technology associated with generating a blockchain structure and associated hash masking details associated with specified services; analyzing common attributes between mobile device providers; determining usage attributes associated with roaming usage of a mobile device with respect to the mobile device providers; and enabling operational functionality of the mobile device at via roaming usage of a network of one of the mobile device providers, in accordance with embodiments of the present invention.

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module," or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing apparatus receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++, spark, R language, or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, device (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing device to produce a machine, such that the instructions, which execute via the processor of the computer or other programmable data processing device, create means for implementing the functions/acts specified in the flowchart and/or block diagram block or blocks. These computer readable program instructions may also be stored in a computer readable storage medium that can direct a computer, a programmable data processing device, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing device, or other device to cause a series of operational steps to be performed on the computer, other programmable device or other device to produce a computer implemented process, such that the instructions which execute on the computer, other programmable device, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The computer system 90 illustrated in FIG. 6 includes a processor 91, an input device 92 coupled to the processor 91, an output device 93 coupled to the processor 91, and memory devices 94 and 95 each coupled to the processor 91. The input device 92 may be, inter alia, a keyboard, a mouse, a camera, a touchscreen, etc. The output device 93 may be, inter alia, a printer, a plotter, a computer screen, a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97. The computer code 97 includes algorithms (e.g., the algorithm of FIG. 2) for improving mobile device and software technology associated with generating a blockchain structure and associated hash masking details associated with specified services, analyzing common attributes between mobile device providers, determining usage attributes associated with roaming usage of a mobile device with respect to the mobile device providers, and enabling operational functionality of the mobile device at via roaming usage of a network of one of the mobile device providers. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices Such as read only memory device 96) may include algorithms (e.g., the algorithm of FIG. 2) and may be used as a computer usable medium (or a computer readable medium or a program storage device) having a computer readable program code embodied therein and/or having other data stored therein, wherein the computer readable program code includes the computer code 97. Generally, a computer program product (or, alternatively, an article of manufacture) of the computer system 90 may include the computer usable medium (or the program storage device).

In some embodiments, rather than being stored and accessed from a hard drive, optical disc or other writeable, rewriteable, or removable hardware memory device 95, stored computer program code 84 (e.g., including algorithms) may be stored on a static, nonremovable, read-only storage medium such as a Read-Only Memory (ROM) device 85, or may be accessed by processor 91 directly from such a static, nonremovable, read-only medium 85. Similarly, in some embodiments, stored computer program code 97 may be stored as computer-readable firmware 85, or may be accessed by processor 91 directly from such firmware 85, rather than from a more dynamic or removable hardware data-storage device 95, such as a hard drive or optical disc.

Still yet, any of the components of the present invention could be created, integrated, hosted, maintained, deployed, managed, serviced, etc. by a service supplier who offers to improve mobile device and software technology associated with generating a blockchain structure and associated hash masking details associated with specified services, analyzing common attributes between mobile device providers, determining usage attributes associated with roaming usage of a mobile device with respect to the mobile device providers, and enabling operational functionality of the mobile device at via roaming usage of a network of one of the mobile device providers. Thus, the present invention discloses a process for deploying, creating, integrating, hosting, maintaining, and/or integrating computing infrastructure, including integrating computer-readable code into the computer system 90, wherein the code in combination with the computer system 90 is capable of performing a method for enabling a process for improving mobile device and software technology associated with generating a blockchain structure and associated hash masking details associated with specified services, analyzing common attributes between mobile device providers, determining usage attributes associated with roaming usage of a mobile device with respect to the mobile device providers, and enabling operational functionality of the mobile device at via roaming usage of a network of one of the mobile device providers. In another embodiment, the invention provides a business method that performs the process steps of the invention on a subscription, advertising, and/or fee basis. That is, a service supplier, such as a Solution Integrator, could offer to enable a process for improving mobile device and software technology associated with generating a blockchain structure and associated hash masking details associated with specified services, analyzing common attributes between mobile device providers, determining usage attributes associated with roaming usage of a mobile device with respect to the mobile device providers, and enabling operational functionality of the mobile device at via roaming usage of a network of one of the mobile device providers. In this case, the service supplier can create, maintain, support, etc. a computer infrastructure that performs the process steps of the invention for one or more customers. In return, the service supplier can receive payment from the customer(s) under a subscription and/or fee agreement and/or the service supplier can receive payment from the sale of advertising content to one or more third parties.

While FIG. 6 shows the computer system 90 as a particular configuration of hardware and software, any configuration of hardware and software, as would be known to a person of ordinary skill in the art, may be utilized for the purposes stated supra in conjunction with the particular computer system 90 of FIG. 6. For example, the memory devices 94 and 95 may be portions of a single memory device rather than separate memory devices.

Cloud Computing Environment

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 7:
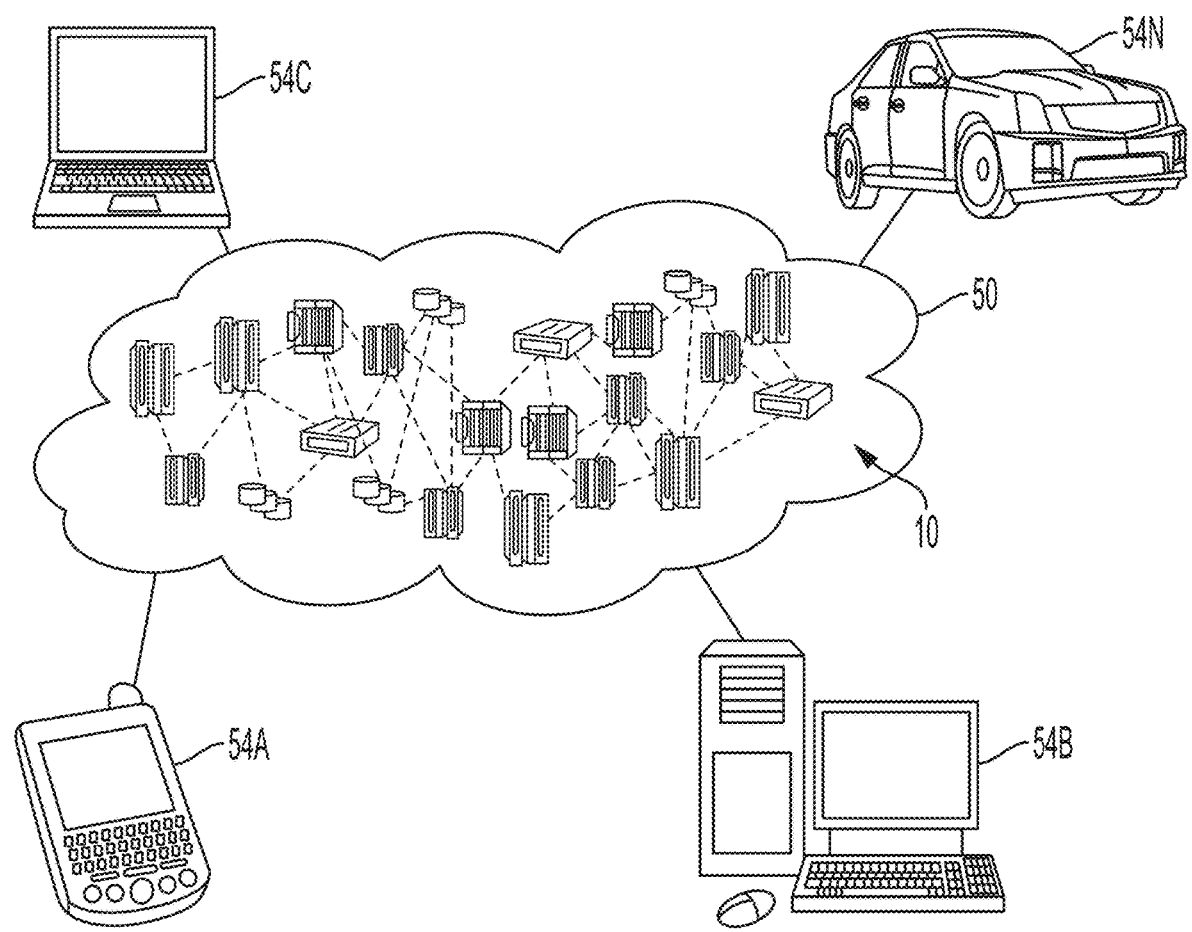
FIG. 7 illustrates a cloud computing environment, in accordance with embodiments of the present invention.

Referring now to FIG. 7, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A, 54B, 54C and 54N shown in FIG. 7 are intended to be illustrative only and that computing nodes 10 and cloud computing environment 50 can communicate with any type of computerized device over any type of network and/or network addressable connection (e.g., using a web browser).

Figure 8:
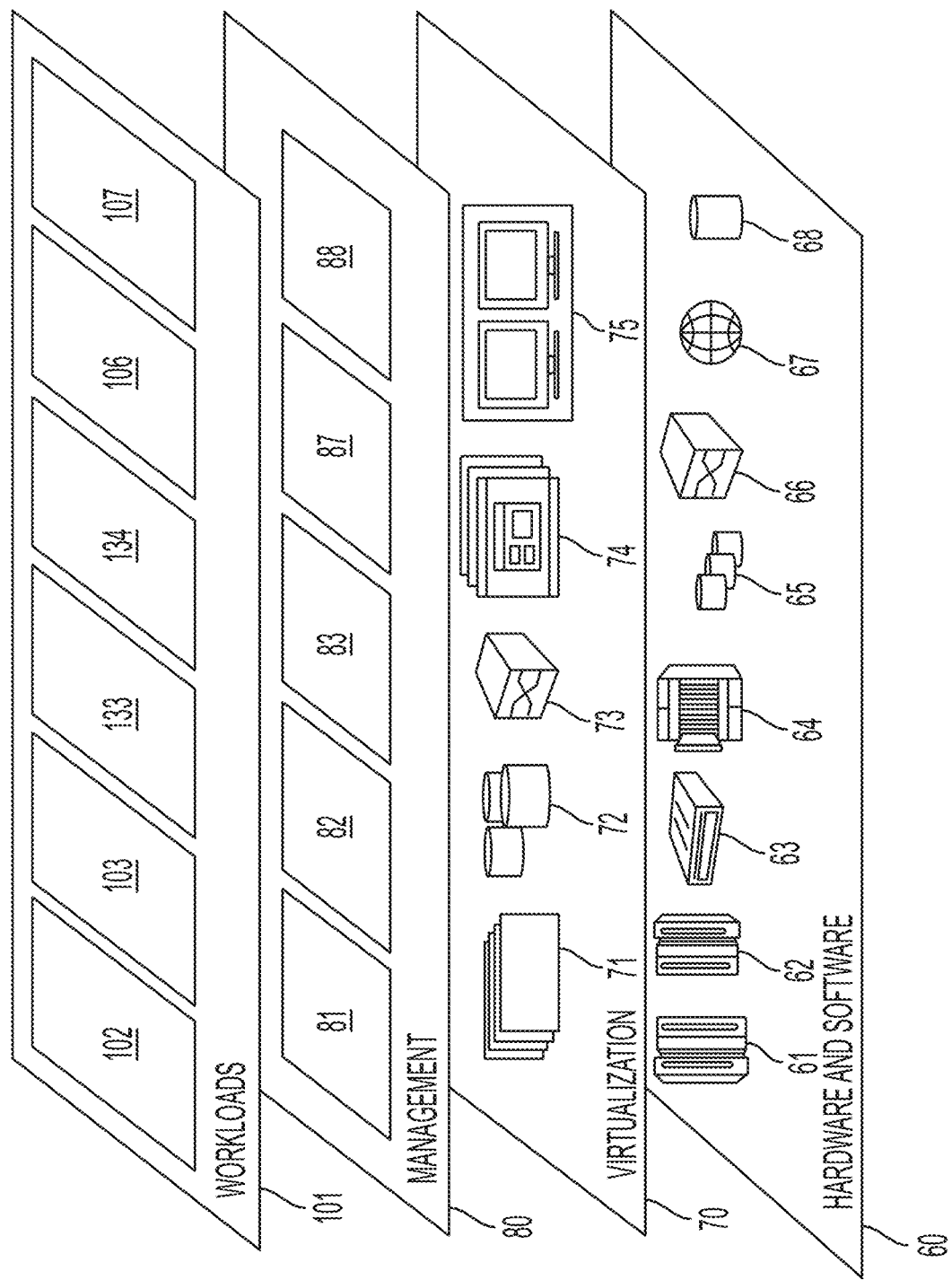
FIG. 8 illustrates a set of functional abstraction layers provided by cloud computing environment, in accordance with embodiments of the present invention.

Referring now to FIG. 8, a set of functional abstraction layers provided by cloud computing environment 50 (see FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 87 provides cloud computing resource allocation and management such that required service levels are met. Service Level Agreement (SLA) planning and fulfillment 88 provide pre-arrangement for, and procurement of, cloud computing resources for which a future requirement is anticipated in accordance with an SLA.

Workloads layer 101 provides examples of functionality for which the cloud computing environment may be utilized. Examples of workloads and functions which may be provided from this layer include: mapping and navigation 102; software development and lifecycle management 103; virtual classroom education delivery 133; data analytics processing 134; transaction processing 106; and for improving mobile device and software technology associated with generating a blockchain structure and associated hash masking details associated with specified services, analyzing common attributes between mobile device providers, determining usage attributes associated with roaming usage of a mobile device with respect to the mobile device providers, and enabling operational functionality of the mobile device at via roaming usage of a network of one of the mobile device providers 107.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A remote mobile device roaming optimization method comprising:

receiving, by a processor of a hardware device from a user, a selection for specified services associated with a first mobile device provider for activation during travel to a specified geographical location associated with mobile device roaming attributes with respect to a mobile device of said user;

generating, by said processor, a blockchain structure comprising details associated with said specified services;

generating, by said processor, a first hash masking sensitive data of said user within said blockchain structure;

detecting, by said processor via a plurality of sensors, that said user and said mobile device have traveled from an initial residence location to said specified geographical location;

enabling for a second mobile device provider, by said processor in response to results of said detecting, access, via said first hash, to said details of said blockchain structure;

analyzing, by said processor via said blockchain structure, common attributes between said first mobile device provider and said second mobile device provider;

determining, by said processor in response to results of said analyzing, usage attributes associated with roaming usage of said mobile device at said specified geographical location with respect to said first mobile device provider and said second mobile device provider;

enabling, by said processor in response to said determining, operational functionality of said mobile device at said specified geographical location via roaming usage of a network of said second mobile device provider;

additionally detecting, by said processor, that said mobile device has exceeded a usage threshold associated with said mobile device roaming attributes with respect to a contract between said user and said first mobile device provider;

generating, by said processor in response to said additionally detecting and a command from said mobile device provider, a second hash masking residency related sensitive data of said user and indicating that said mobile device has exceeded said usage threshold; and transmitting, by said processor, said second hash to said first service provider.

2. The method of claim 1, further comprising:

detecting, by said processor, that said mobile device has accessed additional services during said roaming usage generating, by said processor in response to said detecting that said mobile device has accessed additional services, an additional hash indicating that said mobile device has accessed additional services; and transmitting, by said processor, said additional hash to said first service provider.

3. The method of claim 1, further comprising:

detecting, by said processor via said plurality of sensors, that said user and said mobile device have traveled from said specified geographical location to said initial residence location; and tracking, by said processor via digital tags, contract attributes associated with said first service provider with respect to said roaming usage.

4. The method of claim 3, further comprising:

determining, by said processor based on results of said tracking, a dispute associated with services enabled during said roaming usage; and modifying, by said processor in response to said dispute, terms of said contract attributes.

5. The method of claim 3, further comprising:

determining, by said processor based on results of said tracking, a dispute associated with compensation attributes associated with said roaming usage; and modifying, by said processor in response to said dispute, terms of said contract attributes.

6. The method of claim 3, further comprising:

analyzing, by said processor, said first hash and said second hash; and generating, by said processor, compensation attributes associated with said roaming usage; and generating, by said processor, class indicators associated with shared user information with respect to said roaming usage for enabling ease of consumption correlation actions.

7. The method of claim 1, wherein said hardware device is located at a remote location with respect to locations of said mobile device, said first mobile device provider, and said second mobile device provider.

8. The method of claim 1, further comprising:

providing at least one support service for at least one of creating, integrating, hosting, maintaining, and deploying computer-readable code in the hardware device, said code being executed by the processor to implement: said receiving, said generating said blockchain structure, said generating said first hash, said detecting, said enabling said access, said analyzing, said determining, and said enabling said operational functionality.

9. A computer program product, comprising a non-transitory computer readable hardware storage device storing a computer readable program code, said computer readable program code comprising an algorithm that when executed by a processor of hardware device implements a remote mobile device roaming optimization method, said method comprising:

receiving, by said processor from a user, a selection for specified services associated with a first mobile device provider for activation during travel to a specified geographical location associated with mobile device roaming attributes with respect to a mobile device of said user;

generating, by said processor, a blockchain structure comprising details associated with said specified services;

generating, by said processor, a first hash masking sensitive data of said user within said blockchain structure;

detecting, by said processor via a plurality of sensors, that said user and said mobile device have traveled from an initial residence location to said specified geographical location;

enabling for a second mobile device provider, by said processor in response to results of said detecting, access, via said first hash, to said details of said blockchain structure;

analyzing, by said processor via said blockchain structure, common attributes between said first mobile device provider and said second mobile device provider;

determining, by said processor in response to results of said analyzing, usage attributes associated with roaming usage of said mobile device at said specified geographical location with respect to said first mobile device provider and said second mobile device provider;

enabling, by said processor in response to said determining, operational functionality of said mobile device at said specified geographical location via roaming usage of a network of said second mobile device provider;

additionally detecting, by said processor, that said mobile device has exceeded a usage threshold associated with said mobile device roaming attributes with respect to a contract between said user and said first mobile device provider;

generating, by said processor in response to said additionally detecting and a command from said mobile device provider, a second hash masking residency related sensitive data of said user and indicating that said mobile device has exceeded said usage threshold; and transmitting, by said processor, said second hash to said first service provider.

10. The computer program product of claim 9, wherein said method further comprises:

detecting, by said processor, that said mobile device has accessed additional services during said roaming usage generating, by said processor in response to said detecting that said mobile device has accessed additional services, an additional hash indicating that said mobile device has accessed additional services; and transmitting, by said processor, said additional hash to said first service provider.

11. The computer program product of claim 9, wherein said method further comprises:

detecting, by said processor via said plurality of sensors, that said user and said mobile device have traveled from said specified geographical location to said initial residence location; and tracking, by said processor via digital tags, contract attributes associated with said first service provider with respect to said roaming usage.

12. The computer program product of claim 11, wherein said method further comprises:

determining, by said processor based on results of said tracking, a dispute associated with services enabled during said roaming usage; and modifying, by said processor in response to said dispute, terms of said contract attributes.

13. The computer program product of claim 11, wherein said method further comprises:

determining, by said processor based on results of said tracking, a dispute associated with compensation attributes associated with said roaming usage; and modifying, by said processor in response to said dispute, terms of said contract attributes.

14. The computer program product of claim 11, wherein said method further comprises:

analyzing, by said processor, said first hash and said second hash; and generating, by said processor, compensation attributes associated with said roaming usage; and generating, by said processor, class indicators associated with shared user information with respect to said roaming usage for enabling ease of consumption correlation actions.

15. The computer program product of claim 9, wherein said hardware device is located at a remote location with respect to locations of said mobile device, said first mobile device provider, and said second mobile device provider.

16. A hardware device comprising a processor coupled to a computer-readable memory unit, said memory unit comprising instructions that when executed by the computer processor implements a remote mobile device roaming optimization method comprising:

receiving, by said processor from a user, a selection for specified services associated with a first mobile device provider for activation during travel to a specified geographical location associated with mobile device roaming attributes with respect to a mobile device of said user;

generating, by said processor, a blockchain structure comprising details associated with said specified services;

generating, by said processor, a first hash masking sensitive data of said user within said blockchain structure;

detecting, by said processor via a plurality of sensors, that said user and said mobile device have traveled from an initial residence location to said specified geographical location;

enabling for a second mobile device provider, by said processor in response to results of said detecting, access, via said first hash, to said details of said blockchain structure;

analyzing, by said processor via said blockchain structure, common attributes between said first mobile device provider and said second mobile device provider;

determining, by said processor in response to results of said analyzing, usage attributes associated with roaming usage of said mobile device at said specified geographical location with respect to said first mobile device provider and said second mobile device provider;

enabling, by said processor in response to said determining, operational functionality of said mobile device at said specified geographical location via roaming usage of a network of said second mobile device provider;

additionally detecting, by said processor, that said mobile device has exceeded a usage threshold associated with said mobile device roaming attributes with respect to a contract between said user and said first mobile device provider;

generating, by said processor in response to said additionally detecting and a command from said mobile device provider, a second hash masking residency related sensitive data of said user and indicating that said mobile device has exceeded said usage threshold; and transmitting, by said processor, said second hash to said first service provider.

17. The hardware device of claim 16, wherein said method further comprises:

detecting, by said processor, that said mobile device has accessed additional services during said roaming usage generating, by said processor in response to said detecting that said mobile device has accessed additional services, an additional hash indicating that said mobile device has accessed additional services; and transmitting, by said processor, said additional hash to said first service provider.

* * * * *